United States Patent
Onfroy

(10) Patent No.: US 9,026,332 B2
(45) Date of Patent: *May 5, 2015

(54) METHOD OF CONTROLLING A VEHICLE BRAKE WITH ADAPTIVE TORQUE CORRECTION

(75) Inventor: Dominique Onfroy, Boulogne Billancourt (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 112 days.

This patent is subject to a terminal disclaimer.

(21) Appl. No.: 12/686,056

(22) Filed: Jan. 12, 2010

(65) Prior Publication Data

US 2010/0185376 A1 Jul. 22, 2010

(51) Int. Cl.
*B60T 8/17* (2006.01)
*B60T 13/74* (2006.01)
*B64C 25/46* (2006.01)
*F16D 66/00* (2006.01)

(52) U.S. Cl.
CPC ............ *B60T 8/1703* (2013.01); *B64C 25/46* (2013.01); *F16D 2066/006* (2013.01); *F16D 2066/001* (2013.01); *F16D 66/00* (2013.01); *B60T 13/74* (2013.01)

(58) Field of Classification Search
CPC ....... B60T 8/1703; B64C 25/46; F16D 66/00; F16D 2066/001; F16D 2066/006
USPC ........ 701/70, 72, 75, 78, 83; 303/20, 155, 11; 180/370, 325
See application file for complete search history.

(56) References Cited

U.S. PATENT DOCUMENTS

| | | | |
|---|---|---|---|
| 6,000,507 A | 12/1999 | Bohm et al. | |
| 6,036,285 A * | 3/2000 | Murphy | 303/112 |
| 6,890,041 B1 * | 5/2005 | Ribbens et al. | 303/126 |
| 7,346,443 B2 | 3/2008 | Thibault | |
| 7,349,787 B2 * | 3/2008 | Thibault | 701/70 |
| 8,036,802 B2 * | 10/2011 | Thibault | 701/70 |
| 8,290,676 B2 * | 10/2012 | Thibault et al. | 701/70 |
| 2004/0232762 A1 * | 11/2004 | Maron | 303/20 |
| 2005/0001474 A1 | 1/2005 | Zierolf | |
| 2005/0137773 A1 * | 6/2005 | Goebels et al. | 701/78 |
| 2007/0222285 A1 * | 9/2007 | Ribbens et al. | 303/139 |

(Continued)

FOREIGN PATENT DOCUMENTS

| | | |
|---|---|---|
| DE | 195 36 694 A1 | 4/1997 |
| EP | 1 695 887 A1 | 8/2006 |
| WO | 2005/100113 A1 | 10/2005 |

*Primary Examiner* — John Q Nguyen
*Assistant Examiner* — Michael Whalen
(74) *Attorney, Agent, or Firm* — Sughrue Mion, PLLC

(57) ABSTRACT

The invention relates to a method of controlling a vehicle brake adapted to exert a braking force in response to an actuation setpoint, in which:

from a braking setpoint including low frequency components and high frequency components, a nominal actuation setpoint is determined for the brake actuator that takes account of all of the components of the braking setpoint;

from the same braking setpoint, and from a measurement of the torque developed by the brake, a correction for the nominal actuation setpoint is determined, the correction taking account only of low frequency variations in the braking setpoint, the correction being adapted to take account of current or future operating conditions of at least said brake or of brakes subjected to the same braking setpoint; and the correction is added to the nominal setpoint.

5 Claims, 1 Drawing Sheet

(56) References Cited

U.S. PATENT DOCUMENTS

| | | | |
|---|---|---|---|
| 2008/0231109 A1* | 9/2008 | Yamada et al. | 303/20 |
| 2008/0288151 A1* | 11/2008 | Goebels et al. | 701/78 |
| 2009/0024290 A1* | 1/2009 | Thibault et al. | 701/70 |

* cited by examiner

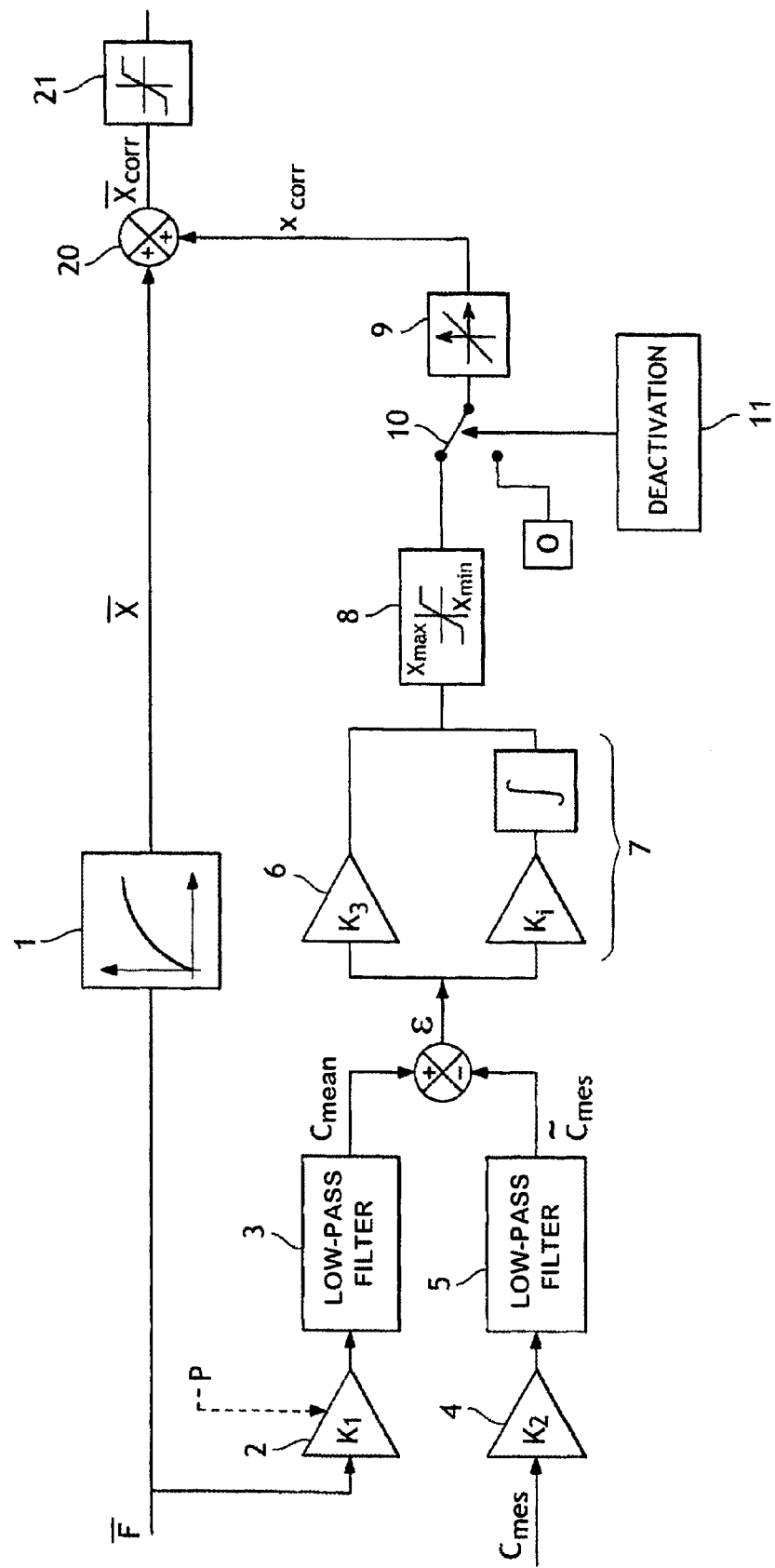

METHOD OF CONTROLLING A VEHICLE BRAKE WITH ADAPTIVE TORQUE CORRECTION

The invention relates to a method of controlling a vehicle brake with adaptive torque correction.

BACKGROUND OF THE INVENTION

Vehicle braking systems include braking actuators (hydraulic or electromechanical) for applying a braking torque to the wheels of the vehicle tending to slow the vehicle down.

Most brake controllers known in aviation make use of a setpoint that is converted either into a pressure for hydraulic brakes or into a force for application or into a displacement of a pusher when using brakes with electromechanical actuators.

Controllers have also been proposed that make use of a torque setpoint and that organize their feedback loops on the basis of the measured torque, as described in document US 2005/0001474. Those controllers present the advantage of taking overall account of the action of the brake via the torque control generated thereby, making it possible to adapt to dispersions in brake torque responses for a given braking force.

Nevertheless, those controllers using a large passband can interfere with the anti-locking protection of the wheels, in particular when there is a phase difference between the torque commands and the anti-locking commands. Under certain grip conditions, torque control delivers a torque setpoint that is temporarily zero in order to prevent the wheels locking. However if the wheel locks in untimely manner, then the measured torque disappears suddenly and the measured torque is then equal to the zero torque setpoint. The wheel therefore remains locked, without the brake being controlled to release the wheel.

OBJECT OF THE INVENTION

An object of the invention is to provide brake control making use of a force or position setpoint but that nevertheless takes account of the measured torque.

BRIEF DESCRIPTION OF THE INVENTION

In order to achieve the invention, there is provided a method of controlling a vehicle brake that is adapted to exert a braking force in response to an actuation setpoint, the method comprising the following steps:
  from a braking setpoint, determining a nominal actuation setpoint for the brake actuator while taking account of all of the components of the braking setpoint;
  from the same braking setpoint, and from a measurement of the torque developed by the brake, determining a correction for the nominal actuation setpoint, the correction taking account only of low frequency variations in the braking setpoint; and
  applying the correction to the nominal actuation setpoint.

Thus, the brake is indeed controlled depending on the braking setpoint and not on torque. The torque measurement is used herein solely to produce a low frequency correction to the nominal actuation setpoint, which is itself calculated while taking account of high frequency components in the braking setpoint.

The low frequency correction as proposed in this way serves to reduce braking torque dispersions for a given braking setpoint, which dispersions may be caused by dispersion in the applied braking force or by dispersion in the torque response of the brake to the applied braking force.

In addition, the low frequency correction as proposed in this way remains compatible with anti-locking protection that modulates the braking setpoint at high frequency in order to avoid the wheel locking.

One of the advantages of the invention is to enable the brake to operate in a degraded mode in the event of the torque sensor failing. The correction is then arbitrarily canceled or maintained at its current value, and the brake is then regulated solely as a function of the braking setpoint.

In the particular circumstance of a position setpoint, the torque correction of the invention serves to compensate for thermal expansion that can cause the force actually applied by the brake to vary.

Advantageously, the torque correction is adaptive and takes account of the operating conditions of the brake or of nearby brakes, in particular those carried by a single undercarriage and all receiving the same braking setpoint.

BRIEF DESCRIPTION OF THE DRAWING

The invention can be better understood in the light of the following description with reference to the sole FIGURE that is a block diagram of a particular implementation of the method of the invention.

DETAILED DESCRIPTION OF THE INVENTION

The invention is described herein in its application to an aircraft brake of the type having electromechanical actuators that are displacement-controlled. A computer (not shown) generates a braking setpoint $F$. The setpoint is corrected at high frequency by an anti-lock protection system that continuously monitors the slip rate of the wheel so as to detect therefrom any start of wheel locking, and it correspondingly decreases the braking setpoint $\overline{F}$ to avoid the wheel locking.

In known manner, a converter 1 transforms the braking setpoint $\overline{F}$ into a position setpoint $\overline{X}$ for the pusher of the actuator, here using a non-linear model 1. The position setpoint $\overline{X}$ is calculated in this example at a high calculation frequency compatible with the speed of operation of the anti-lock protection system, so that the position setpoint $\overline{X}$ takes account both of low frequency components and of high frequency components in the braking setpoint $\overline{F}$.

According to the invention, a low frequency position correction $x_{corr}$ is calculated, and it is added by means of a summing circuit 20 to the position setpoint $\overline{X}$ so as to obtain a corrected position setpoint $\overline{X}_{corr} = \overline{X} + x_{corr}$. This position correction $x_{corr}$ takes account of the measured torque in the following ways.

Firstly, an image of the mean torque $C_{mean}$ is produced corresponding to the braking setpoint $\overline{F}$. For this purpose, the braking setpoint $\overline{F}$ is provided to a proportional stage 2 of gain K1 so as to make it comparable to a torque, and is then subjected to a first lowpass filter 3 so as to eliminate all of the high frequency components, and in particular those that are due to implementing anti-locking protection.

A measurement of the torque $C_{mes}$ actually exerted by the brake is also used and is delivered to a proportional stage 4 of gain K2, and is then subjected to a second lowpass filter 5 in order to eliminate all of the high frequency components together with measurement noise. This produces a calibrated measured torque $\tilde{C}_{mes}$.

The mean torque $C_{mean}$ and the calibrated measured torque $\tilde{C}_{mes}$ are applied as inputs to a comparator that generates an error $\epsilon$. The error is subjected to processing, being delivered to a controller providing both proportional action 6 of gain K3 and integral action 7, and finally to a saturator stage 8 serving to limit the correction to values lying within the range [$x_{min}$, $x_{max}$]. This saturation avoids excessive corrections that would disturb the proper operation of the brake or that would lead to too great a force being applied, i.e. a force greater than a limit force that is acceptable to the brake.

Preferably, and in known manner, the integral action 7 includes anti-runaway protection that freezes the integral action with the correction is saturated by the saturator stage 8, so as to avoid incrementing the integral of the error ϵ so long as the correction is saturated.

The output from the saturator stage 8 is then delivered to a slope limiter 9 that has the function of guaranteeing that variations in the correction are progressive. This produces the looked-for position correction $x_{corr}$.

When the aircraft is stationary, it is still possible to apply a braking force, e.g. to keep the aircraft stationary while parked. The force then applied leads to a non-zero mean torque $C_{mean}$ even though the measured torque $C_{mes}$ is zero or very small. In such a situation, the torque error would be large and would lead to a large correction, thereby further increasing the displacement of the actuator pusher, and thus contributing to increasing the applied force. To avoid such a situation, the correction is neutralized. To perform such neutralization, a switch 10 is provided that is controlled by a correction deactivator member 11, serving to switch the input of the slope limiter 9 to a fixed value, here selected to be equal to zero. This switching also serves to neutralize the correction when it is detected that the torque sensor providing the measured torque $C_{mes}$ is faulty. The slope limiter 9 downstream from the switch 10 serves to avoid the correction jolting in the event of such switching, and also when switching back again.

Advantageously, in addition and as shown here, or as a replacement for the saturator stage 8, there is provided a saturator stage 21 for saturating the corrected setpoint $\overline{X}_{corr}$ so as to guarantee that the corrected setpoint remains within levels that are compatible with the mechanical integrity of the components of the brake.

According to the invention, use is made of a gain K1 that is variable so as to enable the torque correction to be adapted to the operating conditions of the brake as a function of various parameters, such as the speed of the aircraft or the operating point of the brake, by making use of an appropriate numerical model. Varying the gain K1 serves to adapt the estimation of the mean torque $C_{mean}$ to the current or future operating conditions of the brake. The purpose of this adaptation is to limit operating stages in which the corrected setpoint is saturated. Although it is necessary to saturate the correction for the reasons set out above, operation in saturated mode is naturally not the looked-for mode of operation since it has the consequence of imperfectly correcting the torque response.

Advantageously, account can be taken not only of the parameters relating to the brake in question, but also of parameters relating to other brakes, in particular to those that receive the same braking setpoint, thus making it possible to ensure that the brakes are subjected to more uniform wear or heating.

Thus, and in a first adaptation strategy, it is verified whether the corrected position setpoint is or is not saturated by the saturator stage 21 (or by the saturator stage 8 depending on the embodiment) being at the maximum saturation limit. Such saturation indicates that the mean torque $C_{mean}$ has been overestimated relative to the mean torque that the brake is genuinely capable of delivering, which may occur with certain types of braking in which the torque response of the brake is weaker than its nominal response. To remedy this overestimation, the value of the gain K1 is lowered. Thus, the estimated mean torque $C_{mean}$ is lower for the same force setpoint, thus making it possible to bring the correction $x_{corr}$ back into a non-saturated operating range by ensuring that the mean torque $C_{mean}$ associated with the maximum setpoint F corresponds to the maximum torque that can really be developed by the brake for the particular braking conditions that are taking place.

In a variant of this first strategy, the gains K1 of a set of brakes subjected to the same braking setpoint F are lowered together, e.g. all of the brakes of the wheels carried by one undercarriage. This adaptation serves to ensure that the torques generated by the brakes in question are uniform.

Naturally, in the event of the corrected setpoint saturating at the minimum saturation limit, it is appropriate not to lower the gain K1, but on the contrary to increase it.

In a second adaptation strategy, the gain K1 is adapted as a function of parameters representative of future braking. It is known that the torque response of a brake is influenced by its initial temperature and by the braking energy that is to be dissipated. Thus, the coefficient K1 may be adapted as a function of the mean initial temperature of the brakes of the aircraft and/or of the speed and the mass of the aircraft (representative of the braking energy), such that the mean torque $C_{mean}$ associated with the maximum setpoint F corresponds to the maximum torque that can really be developed by the brakes for future particular braking conditions.

In a third strategy, account is taken of the disparities between the initial conditions of the various brakes receiving the same braking setpoint. It can happen that at the beginning of braking all of the brakes are not at the same temperature or at the same degree of wear. Since they have different initial conditions, next time the various brakes brake, they will develop different torques in response to the same setpoint, and they will therefore be subjected to different amounts of heating, thereby possibly increasing the temperature disparities between the brakes. Adapting the coefficient K1 makes it possible to reduce these disparities by making greater use of the brakes that are cooler or less likely to be heated (in particular new brakes).

For example, if one brake heats up more than the others during a first braking operation, it may then present a higher torque response during the following braking operation, thereby contributing to even greater additional heating compared with the other brakes. To mitigate that drawback, on observing prior to braking that this brake is hotter than the others, it is possible to lower the gain K1 for this brake so that the mean torque $C_{mean}$ demanded of this brake is decreased. This brake is thus stressed less than the others so it heats up less than the others, thereby causing the temperatures of the brakes in question to become more uniform.

The invention is not limited to the above description, but on the contrary it covers any variant coming within the ambit defined by the claims.

In particular, although the invention is described in relation to brakes having electromechanical actuators that are controlled in position, the invention applies more generally to any other type of control. For example, it is possible to generate force actuation setpoints for brakes of the same type, or pressure actuation setpoints for hydraulic brakes, these actuation setpoints being corrected according to the invention by means of a measurement of the torque generated by the brake.

Although it is stated herein that the correction is switched suddenly to a zero value when it is to be neutralized, provision could be made to deactivate correction in other ways, e.g. by maintaining the last correction value prior to neutralization, and then when correction is reactivated, by restarting from said last value. It is possible to neutralize correction by other means, e.g. by using a conditional summing circuit 20 that stops summing the position correction $x_{corr}$ to the position setpoint $\overline{X}$ in response to an order to neutralize correction.

Although it is stated herein that the adaptation of the torque correction to braking conditions is performed by varying the estimate of the mean torque developed by the brake, in particular by using a variable gain K1, it is naturally possible to make use of other adaptation strategies.

Although a proportional-integral type controller is used herein, it is possible to use other types of controller, e.g. a proportional-integral-derivative controller or some other controller.

Although the image of the mean torque $C_{mean}$ and the measured torque $C_{mes}$ are described as being filtered independently by two independent lowpass filters, it is also possible to omit those two filters and replace them by a single lowpass filter located downstream from the comparator so as to filter the error $\epsilon$.

Finally, although it is stated that in order to determine the correction $x_{corr}$ of the position setpoint, use is made of the braking setpoint $\overline{F}$ that includes the anti-locking correction, and from which the low frequency components are extracted by a lowpass filter, it is possible to determine the position correction in other ways, for example by using the low frequency braking setpoint taken prior to its high frequency correction by the anti-locking protection device (by way of example, the low frequency braking setpoint may come from the pilot-operated pedals or from the deceleration setpoint when braking in a so-called "auto-brake" automatic mode). The nominal setpoint $\overline{X}$ is determined on the basis of an input that is the sum of the low frequency braking setpoint plus the anti-locking correction at high frequency.

What is claimed is:

1. A method of controlling a vehicle brake that is adapted to exert a braking force in response to an actuation setpoint, the method comprising the steps of:

only on the basis of a braking setpoint, determining a nominal actuation setpoint for the brake actuator, taking account of both low frequency components and high frequency components of the braking setpoint;

only on the basis of the same braking setpoint, and of a measurement of the torque developed by the brake, determining independently from determining the nominal actuation setpoint a correction for the nominal actuation setpoint, the correction taking account of low frequency variations in the braking setpoint without taking account of high frequency variations in the braking setpoint; the correction being adapted to take account of the actual or future operating conditions of at least said brake or of the brakes that are subjected to the same braking setpoint; and adding, after determining the nominal actuation setpoint and the correction, the correction to the nominal actuation setpoint in order to obtain a corrected actuation setpoint.

2. The method according to claim 1, wherein, in order to determine the correction, an estimation of a mean torque applied by the brake is constructed from the braking setpoint, and the mean torque is compared with the measured torque; and delivering the corrected actuation setpoint to the vehicle brake.

3. The method according to claim 2, wherein the correction is adapted by causing the estimated mean torque to vary for a given braking setpoint.

4. The method according to claim 3, wherein the mean torque is estimated from the braking setpoint by multiplying the braking setpoint by a gain of adjustable value.

5. An apparatus for controlling a vehicle brake that has an actuator and is adapted to exert a braking force in response to an actuation setpoint, the apparatus comprising:

an input for receiving a braking setpoint;

an input for receiving a measurement of a torque generated by the vehicle brake;

a first calculation section structured to respond only to the braking setpoint and to calculate a nominal actuation setpoint for the actuator of the brake taking into account of both low frequency components and high frequency components of the braking setpoint;

second calculation section structured to respond to the braking setpoint and to the measured torque to calculate independently from determining the nominal actuation setpoint a correction of the nominal actuation setpoint that takes account of low frequency variations in the braking setpoint without taking account of high frequency variations in the braking setpoint, the second calculation section taking account of the operating conditions of at least the brake, or of the brakes that receive the same braking setpoint; and an output delivering, after a determination of the nominal actuation setpoint and the correction for the nominal actuation setpoint, the sum of the actuation setpoint plus the actuation setpoint correction to the brake actuator.

* * * * *